United States Patent [19]

Peterson et al.

[11] Patent Number: 5,884,275
[45] Date of Patent: Mar. 16, 1999

[54] METHOD TO IDENTIFY HAZARDOUS EMPLOYERS

[76] Inventors: Donald R Peterson, 134 Silverado Springs Dr., Napa, Calif. 94558; Richard R Elliott, 7062 Offenbach Ct. NE., Keizer, Oreg. 97303; Daniel A Adelman, 1699 Kenard St. NW., Salem, Oreg. 97303

[21] Appl. No.: 582,212
[22] Filed: Jan. 2, 1996
[51] Int. Cl.[6] .................................................. G07B 17/60
[52] U.S. Cl. .................... 705/7; 364/400; 705/1
[58] Field of Search .................... 364/400, 550, 364/551.01; 705/1, 4, 7

[56] References Cited

U.S. PATENT DOCUMENTS 4,347,568  8/1982  Giguere et al. ...................... 705/2 X
5,613,072  3/1997  Hammond et al. .................... 705/4

Primary Examiner—Edward R. Cosimano

[57] ABSTRACT

This invention provides a new method whereby high hazard employers, that is, those employers with a high rate of work-related injuries and illnesses, can be individually identified and ranked based on their work hazardousness within a specified geographical area. The invention involves the processes of creating a firm's average weekly wage, a firm's employment, a firm's frequency of injuries and illnesses, a firm's severity of injuries and illnesses, a firm's resource efficiency factor, a firm's preventable nature factor, and a firm's hazard rating values. The processes result in a ranked listing of the most hazardous employers.

18 Claims, 9 Drawing Sheets

METHOD TO IDENTIFY HAZARDOUS EMPLOYERS

This invention relates to the field of safety and health in the work environment. More specifically, it relates to a method whereby high hazard employers, that is, those employers with a high rate of work-related injuries and illnesses, can be individually identified and ranked based on their work hazardousness.

BACKGROUND OF THE INVENTION:

Work-related injuries and illnesses cause pain, suffering and economic loss for workers, lost productivity and high workers' compensation costs for employers, and increased prices for consumers. In 1970, the Occupational Safety and Health Act was enacted to help alleviate these problems. The purpose of that Federal law (Public Law 91-596), is ". . . to assure so far as possible every working man and woman in the Nation safe and healthful working conditions." Since 1970, the Occupational Safety and Health Administration (OSHA), U.S. Department of Labor, has assumed primary responsibility for administering this Federal law.

To date, OSHA, other government agencies and private firms have not been able to identify individual high hazard employers and target scarce resources to help prevent injuries and illnesses. As a result, the objective of reducing occupational injuries and illnesses in this country has not begun to be met. In fact, the incidence of serious work-related injuries and illnesses has been increasing. The U.S. Bureau of Labor Statistics (BLS), Department of Labor, estimates that more than 8 in every 100 workers suffer a job-related injury or illness every year. In 1993, over 6.7 million injuries and illnesses were recorded for workers in the private sector. Of these work-related injuries and illnesses, nearly 3.0 million, about one-half, were serious enough to lose time from work or experience restricted work activity or both. About 60 million workdays were lost due to work-related injuries in 1992, or an equivalent of 240,000 work years. In addition, over 368,000 new cases of work-related illnesses were reported in 1992. Workers with occupational illnesses lost about 5 million days from work in 1992.

Because of the increasing trends in injury and illness rates in the Nation, both the U.S. Senate and House of Representatives in their fiscal 1994 appropriation bills called on the U.S. Department of Labor (DOL) to report back to them about the adequacy of data for targeting inspections to individual establishments. That DOL report transmitted by Secretary of Labor Robert Reich on Jul. 27, 1994 and titled "The Availability and Use of Data on Occupational Injuries and Illnesses," discusses the obstacles to obtaining rankings of individually identified, high hazard employers. Page 5 of that report details problems with using data from this nation's prime collector of injuries and illnesses statistics, DOL's own Bureau of Labor Statistics. It states as follows: "Besides the technical questions that arise from using individual responses to a sample survey to target enforcement, the BLS occupational injury/illness statistical program does not provide OSHA with a basis for ranking the relative safety of establishments. As with any sample survey, the design of the BLS annual survey selects only a small proportion of the employers OSHA needs to rank establishments. While the BLS survey responses are aggregated into reliable statistical estimates for the entire population, meaningful establishment rankings are not possible because the site specific experience of the much larger group of employers who were not selected for the survey remains unknown. Moreover, BLS, along with other Federal statistical agencies, is committed to maintaining the confidentiality of all employers, establishments, and individuals who respond to its statistical programs. Thus, individually identifiable data on employers, workers, and establishments are not available from any BLS program." The present invention differs from these prior attempts by including the universe rather than a sample of a given population of employers; producing high hazard rankings by individual employers rather than by industry or other summary groupings; and does not have the confidentiality restrictions.

OSHA and states, by targeting their inspection and consultation efforts, taking into account their available finite resources and the hazardousness of employers, can become more effective in reducing this nation's injury and illness record. Yet today no adequate listing or ranking of high hazard employers exists for their use. The solution to this long standing problem is contained in the invention process described herein.

Some states, like Oregon and Washington, have attempted to solve the problem of identifying high hazard employers. They have attempted to use injury and illness claims data from workers' compensation files and employment data from the state Unemployment Insurance files to derive a frequency rate for ranking high hazard employers. These states have used rather simplistic approaches and have only been able to identify the frequency of injuries and illnesses. Moreover, these states have encountered problems with matching employer files, using different employer definitions, and using different employer identifiers. Most all other states lack the needed data to develop such rankings of high hazard employers. Generally, the employment or other basis for a rate is not available. Even if all data components are available somewhere within the state government, then many times, (as in the case cited earlier of OSHA's inability to use the U.S. Bureau of Labor Statistics data), these states' safety and health agencies are not able to develop such ranking information because of confidentiality restrictions mandated by state statute (privacy laws), agency policy, or both. The present invention uses data from a single employer file; derives an employment number for each employer; is not restricted by confidentiality requirements; and includes many other important factors besides frequency to rank the hazardousness of employers.

Other states, like Maine, have attempted to identify high hazard employers by using only the number of workers' compensation claims. These states rank employers with the most claims as the most hazardous. Only large firms are identified as hazardous in these states. The present invention uses hazard rating values rather than an absolute number of claims. Small firms and medium size firms, as well as large firms, are included. A new method is herein described whereby the much needed firm employment is estimated; this allows for the development of claims frequency rates, and resource efficiency factors rather than just absolute numbers as in the Maine method. In addition, many other factors, besides the number of claims, are considered that provide a fairer, more comprehensive, and more precise identification of hazardous employers. For most all states and the Federal Government, where it had previously been impossible to develop usable firm rates for rankings of high hazard employers, it is now possible.

Many private firms have established safety and health consulting business practices. The service these firms provide to industry is their safety and health expertise in identifying hazards in the workplace and eliminating them.

These private consulting firms have attempted to identify hazardous employers by knowledge of the local community, hazardous industry data and requests for service. The present invention differs in that it includes a comprehensive and scientific method for identifying and ranking individual employers, rather than only being able to identify hazardous industries; does not require local knowledge; and can be used to target employers most in need of consulting assistance.

Whatever the precise merits, features and advantages of the above cited references, none of them achieves or fulfills the purpose of identifying individual employers and ranking them by the degree of hazardousness in their work environments, as does the present invention.

SUMMARY OF THE INVENTION

The object of the present invention is to provide a new method to develop rankings, within a geographic area, of employers (firms or business firms) by degree of work hazardousness. These rankings are based on an individual business firm's hazard rating value, which allows for the evaluation of how hazardous individual business firms are in terms of the risk of job-related injuries and illnesses to a firm's employees, and solves the problem for Federal OSHA, states, and consulting firms of how to identify and rank hazardous employers. The novel method or process used to develop such rankings is dependent on combining various data bases from several sources through use of computers and computer software specifically written for accomplishing this process. The invention involves the processes of creating a firm's average weekly wage, a firm's employment, a firm's frequency of injuries and illnesses, a firm's severity of injuries and illnesses, a firm's resource efficiency factor which accounts for the number of employees at a firm and the corresponding inspection or consultation resource efficiency, a firm's preventable nature factor which accounts for the types of claims that are generally considered preventable, and a firm's hazard rating values. Several existing data bases are utilized. The primary data source is created and maintained by a business association known as the National Council on Compensation Insurance (NCCI) headquartered in Boca Raton, Fla., but similar data bases are also maintained by other workers' compensation rating bureaus and workers' compensation regulatory organizations. While the data bases maintained by the NCCI and other organizations have key data elements utilized in the new process, the data bases by themselves, are not adequate to fulfill the requirements of the present invention. While NCCI and other rating or regulatory organizations data bases contain key data used in the invention process such as a firm's name and location, underwriting class codes, payroll, and number and costs of injuries and illnesses, they do not contain, for example, other important information such as: (1) each firm's employment, which serves as a standard "exposure basis," or denominator critically needed for computing a firm's claims frequency (firm's rate of injuries and illnesses), and also serves as a measure for determining the efficiency of allocating scarce resources to assist a firm in reducing injuries and illnesses; or (2) data about the types of claims that might be prevented by a consultation or inspection. The new process makes up for these and other critical deficiencies by using additional data from secondary sources, new methods for creating needed data, and new algorithms for rank orderings of hazardous firms.

According to one aspect of the invention, it comprises a method for determining a firm's employment that is used as a measure of the exposure to injuries and illnesses for workers in a firm. The data base files of NCCI and other organizations do not contain information on a firm's employment, but they do contain payroll data. Workers' compensation insurance premiums are based on a business firm's dollar amount of payroll which is reported based on underwriting class codes. The invention process provides the needed method to translate a firm's reported payroll by underwriting class codes first to an overall firm average annual wage, and then to an estimated firm employment. This process is accomplished by utilizing published economic data from secondary sources such as the U.S. Bureau of Labor Statistics and various state agencies. The data here being referred to is the average weekly wage of employees by Standard Industrial Classification (SIC) industry. Because average weekly wages fluctuate significantly amongst SIC industries, having average weekly wage data by industry at a very detailed industry classification level is important to producing a "firm level" average annual wage. Using average annual wages directly by themselves, however, does not serve as an adequate work exposure basis because of the marked degree of variability amongst firms' annual payroll amounts.

Since an employer can have multiple underwriting class codes, and/or each class code may have one or more SICs associated with it, an algorithm is employed to solve that problem. For all SICs associated with one class code, the average weekly wages for those SICs are weighted by statewide payroll for the SICs. The derived average weekly wage for each underwriting class code is then weighted by a firm's class code payroll distribution to produce a firm average weekly wage. This number is multiplied by 52 to derive a firm's average annual wage per employee. Using payroll data for an employer from a primary source, a firm's employment can be estimated by dividing a firm's annual payroll by the derived average annual wage.

According to another aspect of the invention, it comprises a method for estimating a firm's preventable nature factor. This factor is important in determining the proportion of a firm's injuries and illnesses that could be favorably impacted by a targeted inspection or consultation. Data concerning preventable injuries and illnesses are available from published secondary sources and classified by SIC. However, since an employer can have multiple underwriting class codes and/or each class code may have one or more SICs associated with it, an algorithm has been created to overcome this problem. For all SICs associated with one class code, the ratio of the statewide (use national data if state data are not available) preventable nature cases for those SICs to the sum of the statewide total nature cases for those SICs is computed. The derived preventable injury and illness factor for each underwriting class code is then weighted by a firm's class code total case distribution to derive a firm's preventable nature factor.

According to another aspect of the invention, it comprises a method for estimating a firm's hazard rating values. Several variables used separately or in combinations can be used to derive a hazard rating value. One of the variables is a firm's claims frequency. The claims frequency shows a firm's relative number of injury and illness occurrences for a standard exposure base. Using data from a primary source, a firm's claims frequency is derived by dividing a firm's total number of claims, which includes indemnity claims and medical only claims, by a firm's employment. Another variable is a firm's claims severity. The claims severity shows the relative costs per claim of a firm's injuries and illnesses. Using data from a primary source, a firm's claims severity is derived by dividing a firm's reported total incurred losses, which includes indemnity claims losses and medical claims losses, by a firm's total number of claims. Another variable is a firm's resource efficiency factor. When providing human and capital resources to a firm for inspection or consultation purposes, the impact of those scarce resources on the reduction of injuries and illnesses must be considered. An inspector or consultant can have greater impact on injury and illness prevention in larger firms than in smaller firms. Travel time, report writing and number of employees performing similar tasks are important elements affecting this resource. By taking the square root or n-th root of a firm's employment, a firm's resource efficiency factor can be derived. By using algorithms that take into account a firm's claims frequency, a firm's claims severity, a firm's resource efficiency factor and a firm's preventable nature factor, hazard rating values are derived. A listing of businesses (firms or employers) by their work hazardousness can be accomplished by rank ordering the firms from highest to lowest hazard rating values, assigning an ordinal number ranking factor, and listing the most hazardous firms.

These and other aspects of the invention will be apparent to one of ordinary skill in the art by reference to the remaining portions of the specifications and drawings.

DETAILED DESCRIPTION OF THE INVENTION

Figure 1:
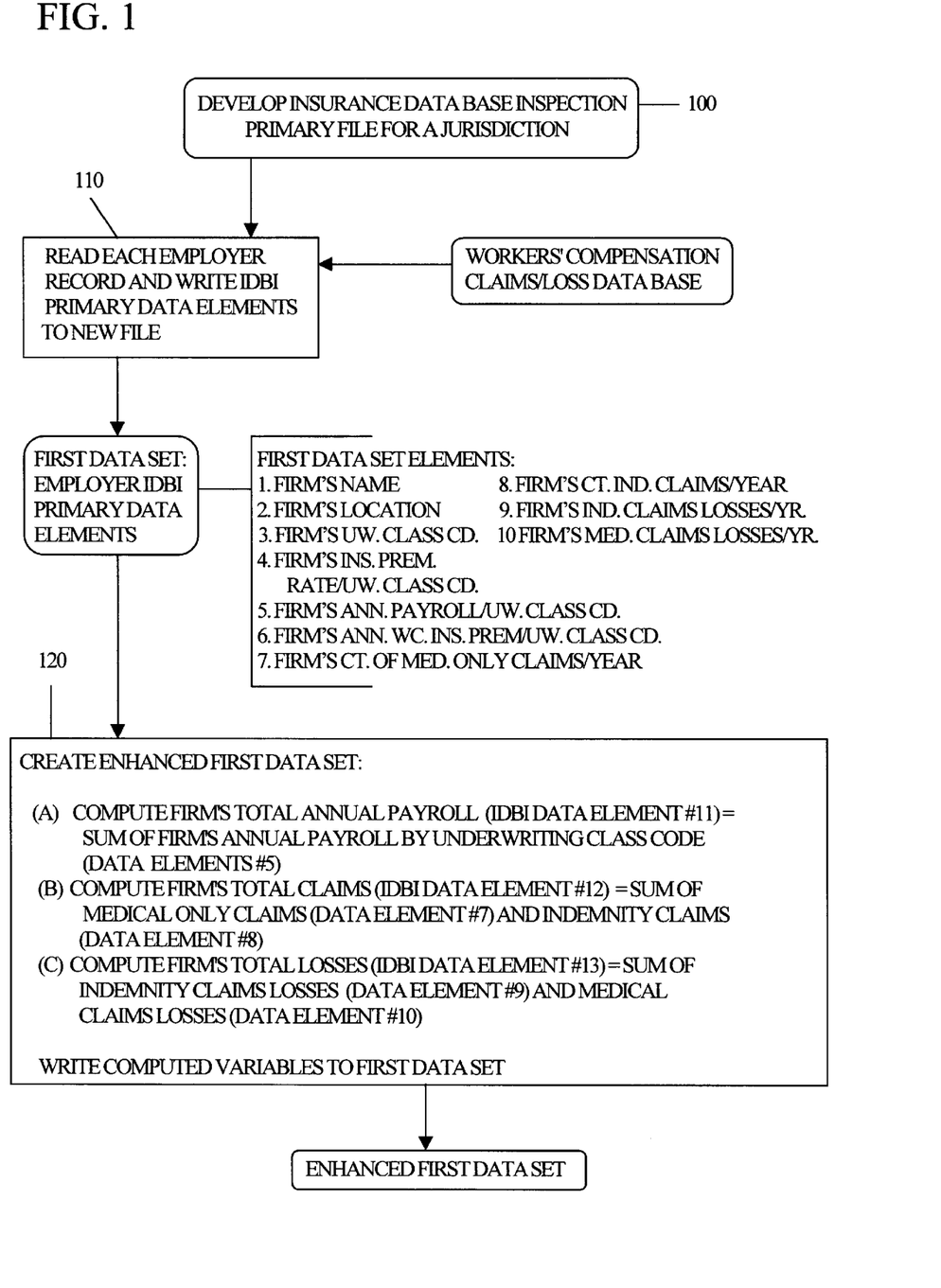
FIG. 1 is a flow chart of an example of an Insurance Data Base Inspection (IDBI) file created from a primary data source.

Referring to FIG. 1, there is shown a process flow chart (100) for the creation of an electronic data base primary file maintained on a computer for a jurisdiction of interest. For clarity and understanding, the name Insurance Data Base Inspection (IDBI) file is here given and used when referring to this developed data base electronic file. An IDBI data base is comprised of selected data elements pertinent to an individual business firm's workers' compensation insurance policy, or record of a firm's workers' compensation experience, including firm name and address, claims, losses, payroll, and other related data. Also included in the IDBI are data elements created out of the invention process. The first set of data flowing into the IDBI at step 110 are read from computer files of a primary source of data such as the National Council on Compensation Insurance, other workers' compensation rating bureaus, or other workers' compensation organizations that research claims and loss data and/or determine workers' compensation insurance premium ratings. Data elements comprising the universe of individual insured business firm's records for a jurisdiction, which make up the IDBI file, are read from the primary source's files, and electronically written to and stored in the IDBI. Typical data elements comprising individual insured business firm's records which make up the IDBI file are:

Data Elements (First Data Set):
1. Firm's Name
2. Firm's Location including Address and Zip Code
3. Firm's Underwriting Class Code
4. Firm's Insurance Premium Rate per $100 of Payroll per Underwriting Class Code
5. Firm's Annual Payroll per Underwriting Class Code
6. Firm's Annual Workers° Compensation (WC) Insurance Premium per Underwriting Class Code
7. Firm's Count of Medical Only claims for a Year
8. Firm's Count of Indemnity claims for a Year
9. Firm's Reported Indemnity claims Losses for a Year
10. Firm's Reported Medical claims Losses for a Year The first data set is also comprised of three data elements that are computed at step 120 from the above data elements. These computed data elements are:

11. Firm's Total Annual Payroll—this data element is computed by summing the firm's annual payroll from each of the firm's underwriting class codes (data element 5)
12. Firm's Total Number of claims for a Year—this data element is computed by summing medical only claims (data element 7) and indemnity claims (data element 8)
13. Firm's Total Incurred Workers° Compensation (WC) Losses for a Year—this data element is computed by summing indemnity claims losses (data element 9) and medical claims losses (data element 10)

These three computed data elements are written to and stored in the IDBI enhanced first data set. The next eight data elements are created as integral steps in the invention process and stored in each insured firm's record in the IDBI. They are described in the following processes.

14. Firm's Average Weekly Wage (created in the invention process)
15. Firm's Employment (created in the invention process)
16. Firm's Resource Efficiency Factor (created in the invention process)
17. Firm's Preventable Nature Factor (created in the invention process)
18. Firm's claims Frequency (created in the invention process)
19. Firm's claims Severity (created in the invention process)
20. Firm's Hazard Rating Value (created in the invention process)
21. Firm's Ordinal Number Ranking Factor (created in the invention process)

To develop an appropriate set of employment data for each individual business firm on the IDBI, a somewhat circuitous process must be followed. In creating employment figures, a second source of non-employment data first needs to be utilized. That data is average weekly wage by industry. This data is collected by state economic statistics agencies (sometimes popularly know as SESAs) and published annually both by them and the U.S. Bureau of Labor Statistics. By itself, average weekly wage by industry contributes nothing to determining required employment information. However, by a process of mathematically manipulating average weekly wage data with other data elements in the IDBI, an estimate of an individual business firm's employment is achieved.

In this process of creating individual business firm's employment levels, a problem is immediately encountered and must be overcome. The problem is that average weekly wages by industry data are published in conformance with industry categories as defined in the Standard Industrial Classification (SIC) Manual published and periodically updated by the Federal Government, Office of Management and Budget. The NCCI, other workers' compensation rating bureaus, and workers' compensation regulatory agencies generally do not use SIC Manual industry definitions with their associated codes. Therefore, those needed industry codes are not on their files. What they do use, and what is on their files is something generally referred to as "Underwriting Class Codes" (data element 3). These codes are based on type of industry and/or occupations and are used in setting workers' compensation insurance premiums for employers. Although faced with two different sets of coding structures, there is commonality in defining business economic activity in both the SIC and insurance underwriting classification systems. For example, the Logging industry has an SIC code assigned to it, and for that same business activity, the SIC code can be matched to an underwriting class code.

Figure 2:
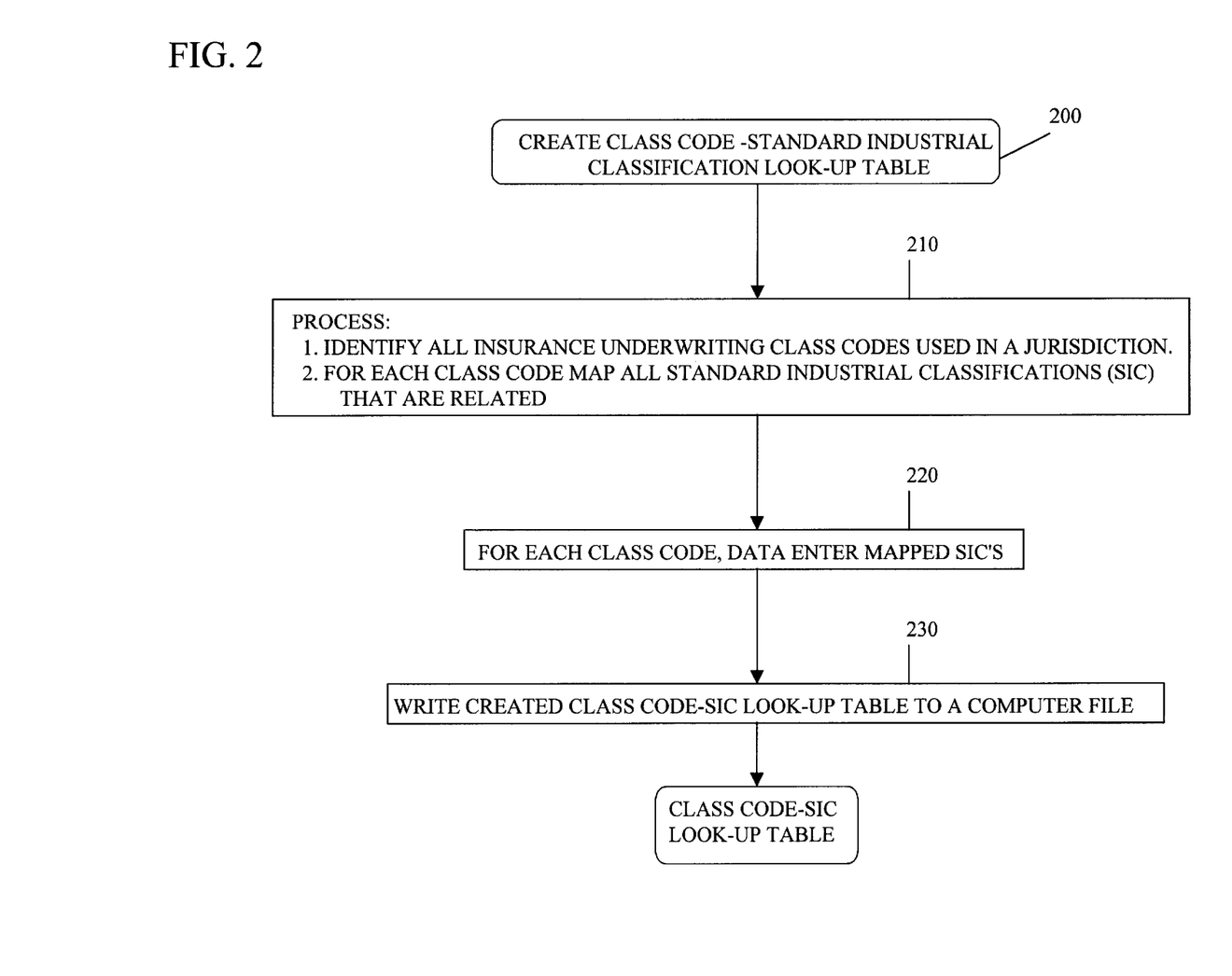
FIG. 2 is a flow chart of a method for creating an Underwriting Class Code-Standard Industrial Classification (SIC) Lookup Table.

Referring to FIG. 2, a method (200) for creating a Class Code-SIC Lookup Table is shown. The process at step 210 identifies all underwriting class codes that are used in a jurisdiction. By utilizing both SIC and underwriting classification systems, and mapping SIC(s) to each class code's appropriate definition, a "crosswalk" or lookup table between the two corresponding classification codes based on those industry definition mappings is created. At step 220, each class code and mapped SIC are data entered. The Class Code-SIC Lookup Table is written to a computer file at step 230.

Figure 3:
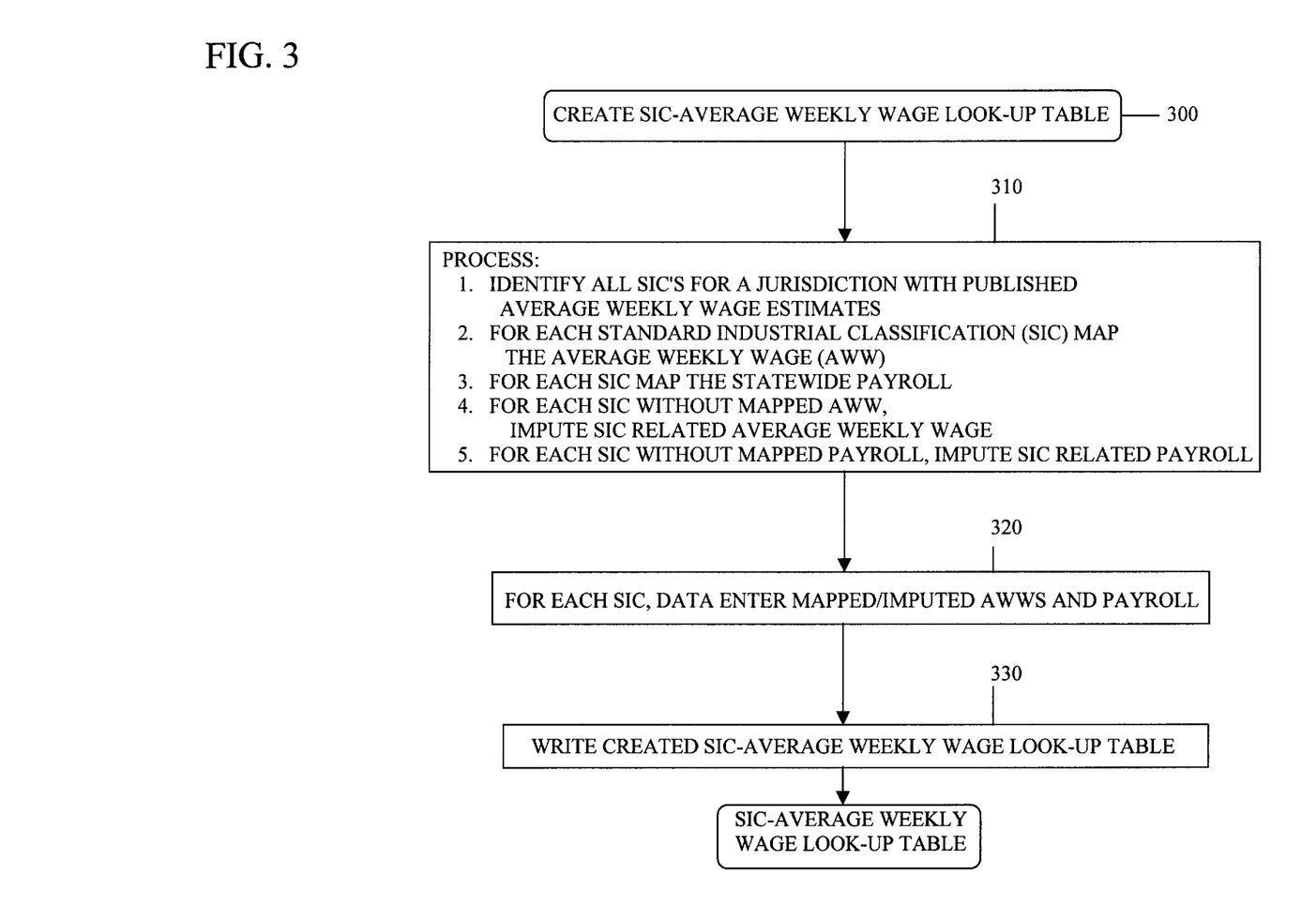
FIG. 3 is a flow chart of a method for creating a SIC-Average Weekly Wage Lookup Table.

Referring to FIG. 3, a method (300) for creating a SIC-Average Weekly Wage (AWW) Lookup Table is shown. For a jurisdiction, all SICs with published AWW estimates are identified at step 310. For each SIC, the statewide AWW and corresponding statewide payroll from published economic data sources are mapped to the SIC. For each SIC without a mapped AWW and payroll, these figures are imputed from the next higher level SIC. In the SIC classification system, SICs are categorized in a hierarchical framework. The next higher level SIC is for a broader, more inclusive industrial category. In many jurisdictions, 4-digit (lower level) SICs are not published because of confidentiality restrictions, and a 3-digit (or higher level) SIC would be used for obtaining the AWW and payroll. For some SICs, however, national AWW data could be more appropriate to use when state data are not available. Each SIC with mapped AWW and payroll is data entered at step 320. These data entered SICs with corresponding AWWs and payrolls are then written to a computer lookup table at step 330.

Figure 4:
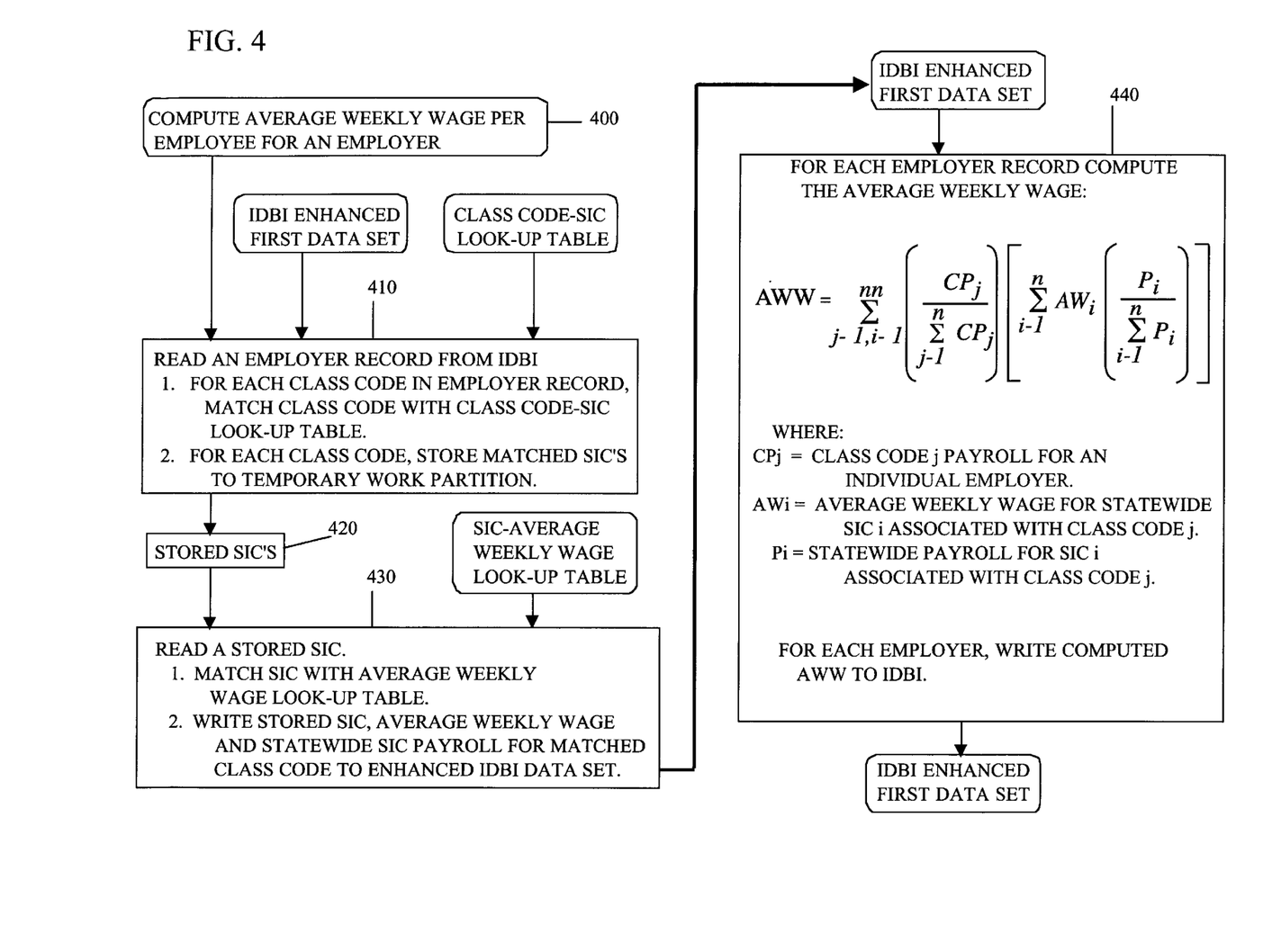
FIG. 4 is a flow chart of a method for creating a Firm's Average Weekly Wage.

Referring to FIG. 4, a method (400) for computing a firm's average weekly wage per employee is shown. An employer record from the IDBI enhanced first data set is read at step 410. For each underwriting class code in the employer record, the class code is matched with the Class Code-SIC Lookup Table. For each matched class code, the corresponding SIC is stored in a temporary work partition at step 420. The stored SICs are read from the temporary work partition at step 430 and matched to the SIC-AWW Lookup Table. The average weekly wage and statewide payroll for each matched SIC are written to the enhanced IDBI first data set for the corresponding underwriting class code. In many cases, an employer will have multiple underwriting class codes associated with an insurance policy, and/or each class code may have one or more SICs associated with it. In these cases, simple use of the SIC-Average Weekly II Wage Lookup Table cannot generate an appropriate average weekly wage. Hence, an algorithm for deriving an appropriate average weekly wage must be employed. The following algorithm at step 440 is used to derive an appropriate average weekly wage for an employer.

Derived Average Weekly Wage per Employee for an Employer=

$$\sum_{j=1, i=1}^{n,n} \left( \frac{CP_j}{\sum_{j=1}^{n} CP_j} \right) \left[ \sum_{i=1}^{n} AW_i \left( \frac{P_i}{\sum_{i=1}^{n} P_i} \right) \right]$$

Where,
$CP_j$=Class Code j payroll for an individual employer.
$AW_i$=Average Weekly Wage for statewide SIC i associated with class code j.
$P_i$=Statewide Payroll for SIC i associated with class code j.

Starting with the inner brackets, the formula states that for each SIC associated with one class code, the average weekly wage for that SIC is multiplied by the ratio of the statewide payroll for the subject SIC to the sum of the statewide payroll for all SICs associated with the corresponding class code. Then each class code's SIC derived average weekly wage is weighted by the employer's class code payroll distribution. For each firm, the computed average weekly wage is written to the IDBI.

A simple example demonstrates the use of the application of the algorithm. Assume the following information.

| | Employer A | | | |
|---|---|---|---|---|
| Class Code | Class Code Payroll | Associated SIC | Statewide SIC Payroll | SIC Average Weekly Wage |
| 1 | $20,000 | 20 | $50,000 | $250 |
| | | 30 | $20,000 | $350 |
| 2 | $40,000 | 40 | $80,000 | $100 |

For Class Code 1 the calculation is $$\left\{ \left( \frac{50000}{70000} (250) \right) + \left( \frac{20000}{70000} (350) \right) \right\} \left( \frac{20000}{60000} \right) = \$92.857$$

For Class Code 2 the calculation is $$\left\{ \left( \frac{80000}{80000} (100) \right) \right\} \left( \frac{40000}{60000} \right) = \$66.667$$

The formula specifies that these two weighted average results are summed, so that the estimated average weekly wage for Employer A is $159.524.

Figure 5:
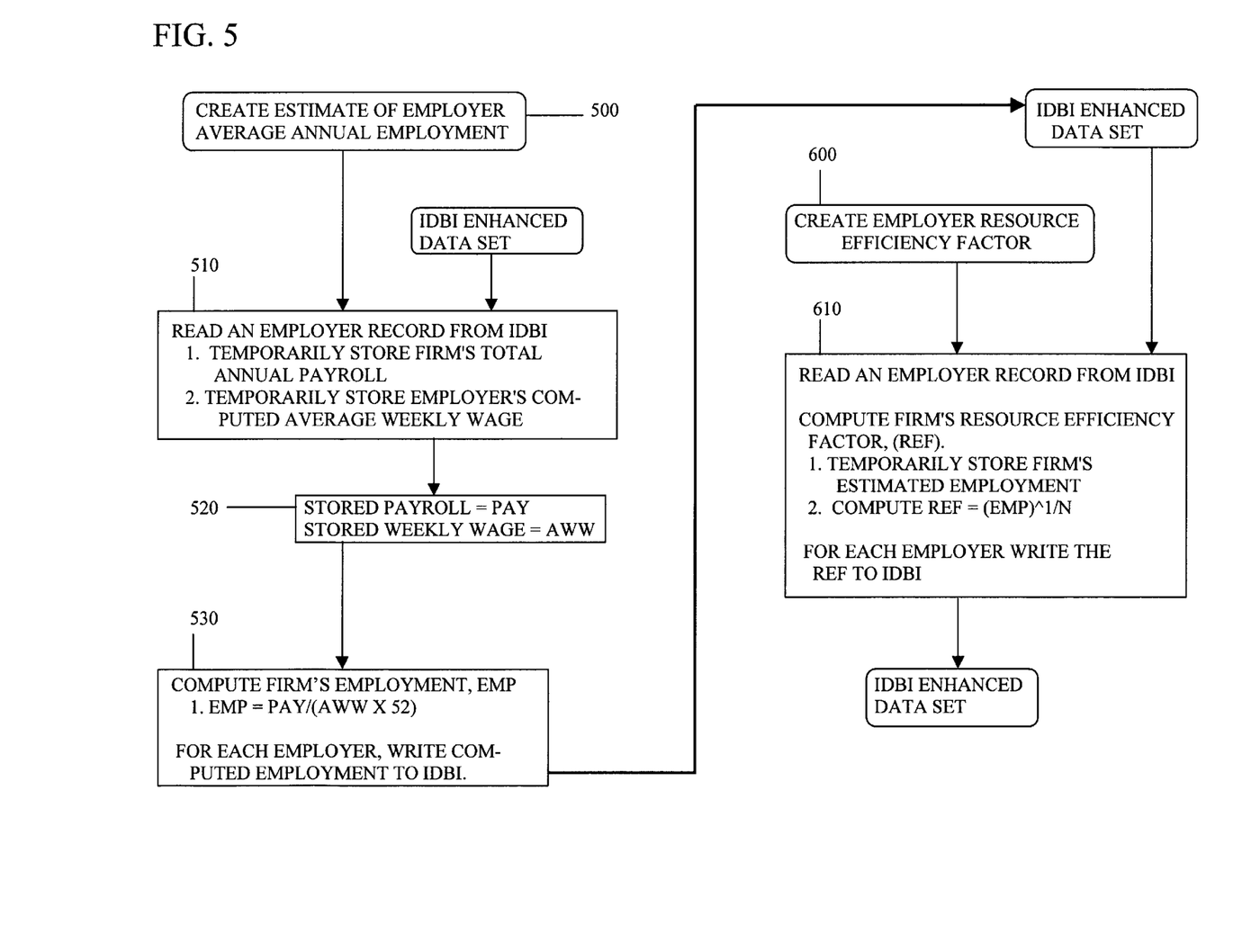
FIG. 5 is a flow chart of a method for creating a Firm's Employment and a Firm's Resource Efficiency Factor.

Referring to FIG. 5, a method (500) for creating an estimate of an employer's average annual employment is shown. An employer record is read from the IDBI at step 510 and the firm's total annual payroll and computed average weekly wage are temporarily stored at step 520. A firm's employment is computed at step 530 according to the formula:

*Employment=Payroll/(Average Weekly Wage×52)*

A firm's average weekly wage is multiplied by 52 to derive a firm's average annual wage per employee which is divided into a firm's annual payroll. Using the example above and given that Employer A's total payroll is $60,000, Employer A's estimated annual employment is $60,000/($159.524×52)=7.2 employees. The computed firm's employment is then written to the IDBI file.

Again referring to FIG. 5, a method (600) for creating a firm's resource efficiency factor is shown. A firm's record is read from the IDBI and the firm's employment is temporarily stored at step 610. A firm's resource efficiency factor is computed by taking the square root or n-th root of a firm's employment; this value is stored in the IDBI enhanced data set. Taking into account the relative size of a firm's employment ensures the efficient use of scarce inspection resources. In allocating scarce safety compliance inspection or consultation resources, it is logical to strive to gain maximum benefit from those resources. Taking the square root (or n-th root) of employment at step 610 ensures that a firm with greater employment, but with a similar frequency and severity experience of another firm with lesser employment, will receive a higher ranking. This in turn ensures the created ranked order of hazardous firms will maximize the use of economic resources for safety and health targeting.

The American National Standard Institute (ANSI) and the U.S. Bureau of Labor Statistics (BLS) both categorize phenomena surrounding on-the-job injury or illness occurrences into standardized classification systems. Both systems, like the Standard Industrial Classification system, have codes associated with each data item in a category. For instance, under the ANSI injuries and illnesses classification system, "Part of Body" (injured) "head," carries the classification code 110. Another major category in both classification systems is called "Nature" (of the injury or illness). "Nature" in the BLS standard is defined as: "The nature of injury or illness identifies the principal physical characteristics of the injury or illness." Examples of data items in the nature category and their corresponding codes are: Amputations (0319), Chemical Burns (051), Poisoning, Carbon Monoxide (0959) and Multiple Traumatic Injuries to Bones, Nerves, or Spinal Cord (018). Because OSHA safety standards have been created to prevent or reduce the occurrence of the first three nature items, safety experts feel these three injury types could be prevented or reduced by enforcement of corresponding safety standards. Listings of those nature categories that are considered preventable and for which an OSHA safety standard exists are available for use in the invention process. Data on numbers of injuries and illnesses by nature, by SIC, are available both nationally and for most states, and are published annually by BLS or other organizations.

Figure 6:
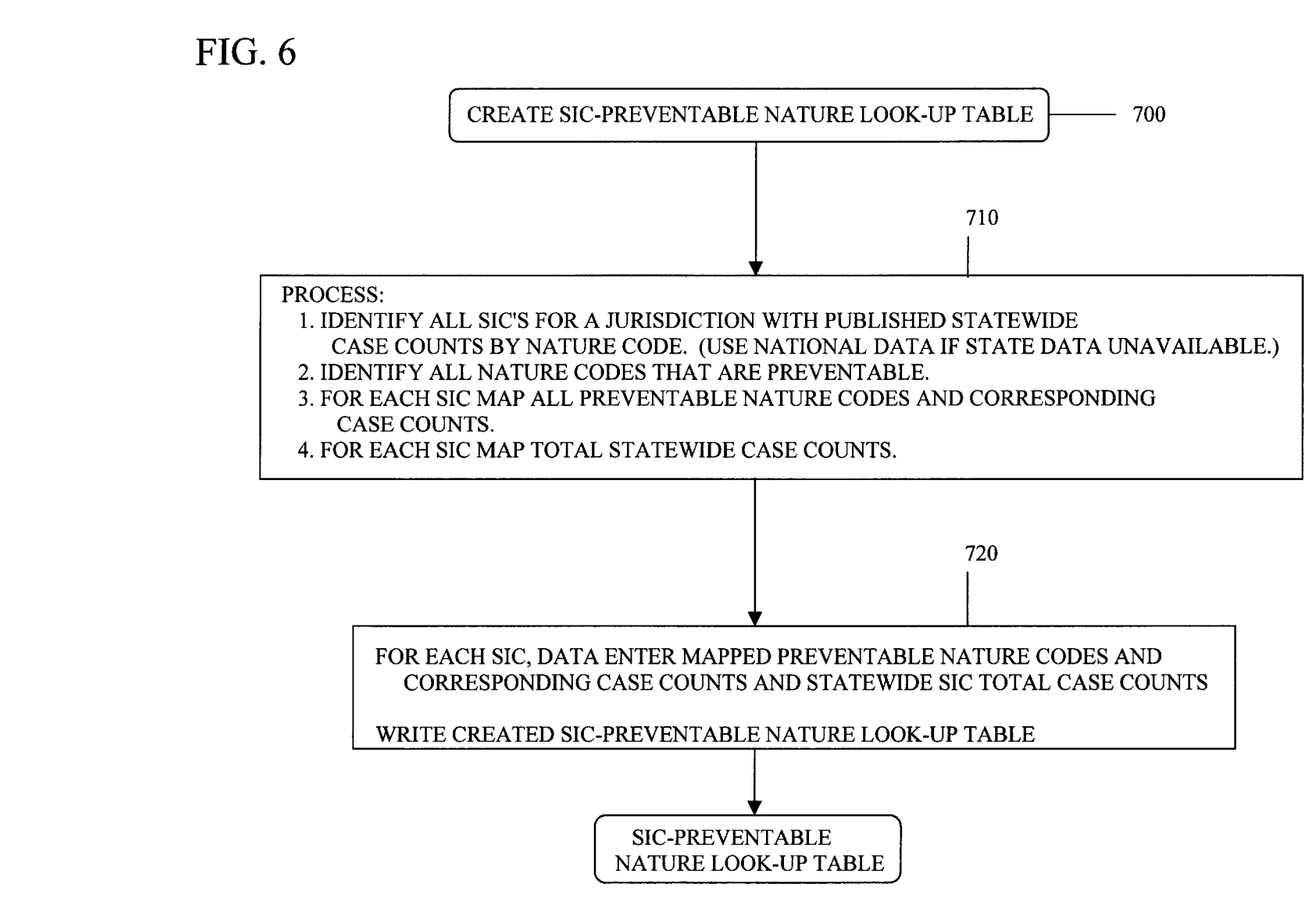
FIG. 6 is a flow chart of a method for creating a SIC-Preventable Nature Lookup Table.

Referring to FIG. 6, a method (700) for creating a SIC-Preventable Nature Lookup Table is shown. The process at step 710 identifies all SICs for a jurisdiction with published statewide case counts by nature codes. For some jurisdictions, these data are not available. National data are used in these situations. Then, all nature codes that are deemed preventable must be identified. Finally, for each SIC, map all preventable nature codes with corresponding case counts and the total statewide case counts. For each SIC, data enter at step 720 the mapped preventable nature codes with corresponding case counts and the total statewide SIC case counts, and write to the SIC-Preventable Nature Lookup Table. A simplified example of such a table for one industry is shown below.

TABLE A

| INDUSTRY CODE (SIC) | CASES BY NATURE OF INJURY OR ILLNESS | | | | |
|---|---|---|---|---|---|
| 3312 | Total Cases | 0319* | 051* | 0959* | 018 |
|  | 500 | 200 | 150 | 50 | 100 |

Table A shows that for SIC industry code 3312, which is "Steel Works, Blast Furnaces and Rolling Mills," there were a total of 500 injuries and illnesses classified with the nature codes displayed. By computer matching the detailed nature coding found in that industry's lookup table, one can determine what percent of that industry's injuries and illnesses could be preventable. To illustrate using the data in Table A, of the four nature codes listed in SIC 3312, there are three preventable nature codes, Amputations (0319), Chemical Burns (051) and Poisoning, Carbon Monoxide (0959). OSHA has safety standards aimed at preventing injuries and illnesses resulting from industrial accidents involving the aforementioned nature codes; and theory postulates, if the standards were put in place by the employer, the injury-producing accident would not have occurred. The fourth nature category, "Multiple Traumatic Injuries to Bones, Nerves, or Spinal Cord (018)" lacks specificity, and would not be included on a preventable injury by nature code listing.

Figure 7:
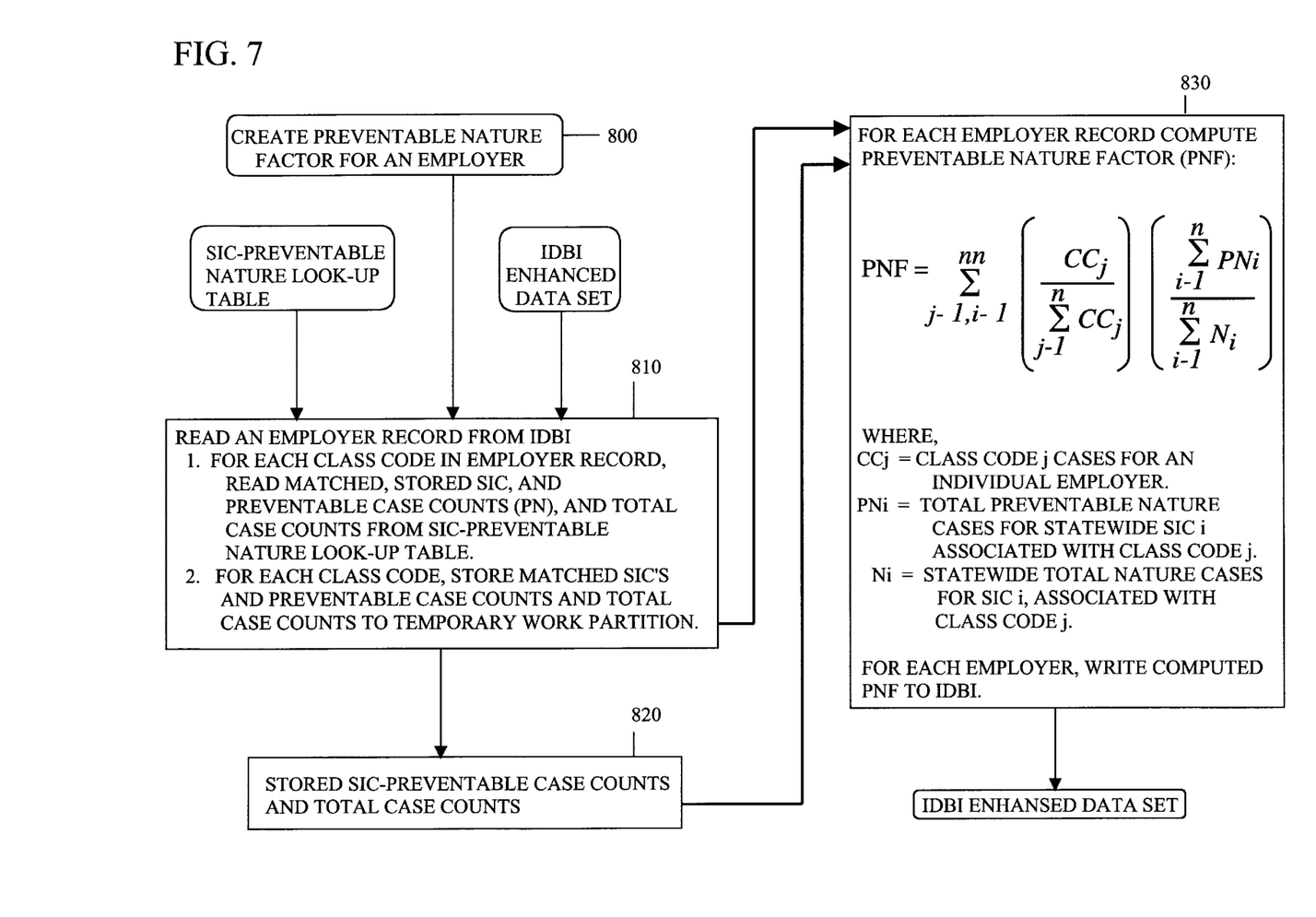
FIG. 7 is a flow chart of a method for creating a Firm's Preventable Nature Factor.

Referring to FIG. 7, a method (800) for creating a firm's preventable nature factor is shown. At step 810, each employer record is read from the IDBI. For each underwriting class code in a firm record, read the matched and stored SIC(s) from the IDBI, and read the preventable case counts and total case counts from the SIC-Preventable Nature Lookup Table, and store in a temporary work partition at step 820. In the simple example above, for the Steel Works, Blast Furnace and Rolling Mills industry (SIC 3312), out of a total of 500 injuries and illnesses, 400 cases (the sum of cases for preventable matched nature codes 0319, 051, and 0959) are found to be preventable. Dividing these 400 injuries and illnesses cases by the total of 500 cases produces a 0.80 value (or 80 percent) which is called a firm's preventable nature factor. In many cases, an employer will have multiple underwriting class codes associated with an insurance policy, and/or each class code may have one or more SICs associated with it. In these cases, simple use of the SIC-Preventable Nature Lookup Table cannot generate an appropriate preventable nature factor for an employer; hence, an algorithm for deriving an appropriate factor must be employed. The following algorithm, part of the invention process at step 830, is used to derive an appropriate preventable nature factor for an employer.

Derived Preventable Nature Factor for an Employer=

$$\sum_{j=1,i=1}^{n,n} \left( \frac{CC_j}{\sum_{j=1}^{n} CC_j} \right) \left( \frac{\sum_{i=1}^{n} PN_i}{\sum_{i=1}^{n} N_i} \right)$$

Where,
  $CC_j$=Class Code j cases for an individual employer.
  $PN_i$=Total of preventable nature cases for statewide SIC i associated with class code j.
  $N_i$=Statewide total nature cases for SIC i associated with class code j.

Starting with the inner brackets, the formula states that for all SICs associated with one class code, the ratio of the statewide preventable nature cases for all of the subject SICs to the sum of the statewide total nature cases for all SICs associated with the corresponding class code is computed. Then, each class code's combined SICs derived preventable nature factor is weighted by the employer's class code total cases distribution.

A simple example demonstrates the use of the application of the algorithm. Assume the following information.

| | | Employer A | | |
|---|---|---|---|---|
| Class Code | Class Code Cases | Associated SIC | SIC Total Cases | SIC Preventable Cases |
| 1 | 200 | 20 | 5,000 | 2,500 |
| | | 30 | 2,000 | 800 |
| 2 | 400 | 40 | 8,000 | 6,000 |

For Class Code 1 the calculation is
$$\left(\frac{2500+800}{5000+2000}\right)\left(\frac{200}{600}\right) = 0.16$$
For Class Code 2 the calculation is
$$\left\{\left(\frac{6000}{8000}\right)\right\}\left(\frac{400}{600}\right) = 0.50$$

The formula specifies that these two weighted average results are summed, so that the computed preventable nature factor for Employer A is 0.66 or 66 percent. The computed firm's preventable nature factor is then written to the IDBI file.

Figure 8:
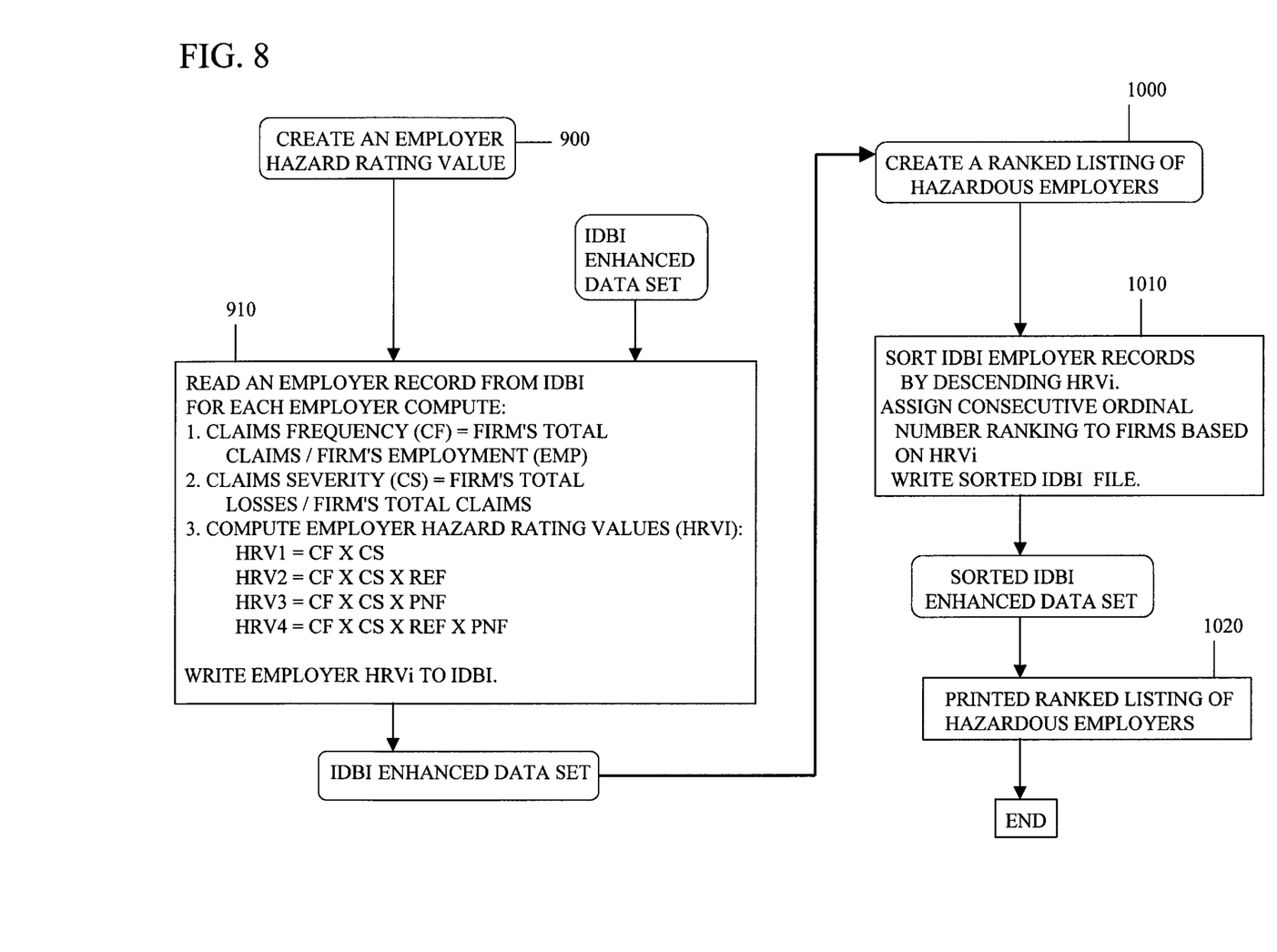
FIG. 8 is a flow chart of a method for creating a Firm's Hazard Rating Values.

Referring to FIG. 8, a method (900) for creating a firm's hazard rating values is shown. For purposes of instruction, a simple example of an algorithm illustrating the hazard rating value is presented below. Building on the process embodied in the simple example, later in this same section, more sophisticated algorithms of the present invention are presented.

| Individual Firm's Data Record as taken from the IDBI data base file at step 910. | |
|---|---|
| Data Elements | Example Data |
| Data Element #1 (Firm's Name) | ABC Corp. |
| Data Element #2 (Firm's Location) | 123 Industrial Way Youngstown, Ohio |
| Data Element #11 (Firm's Total Annual Payroll) | $11,442,862 |
| Data Element #12 (Firm's Total Number of Claims) | 96 |
| Data Element #13 (Firm's Total Incurred WC Losses) | $1,008,439 |
| Data Element #14 (Firm's Average Weekly Wage created in the invention process) | $455.42 |
| Data Element #15 (Firm's Employment created in the invention process) | 483.19 |
| Data Element #18 (Firm's Claims Frequency created in the invention process) | .199 |
| Data Element #19 (Firm's Claims Severity created in the invention process) | $10,504.57 |
| Data Element #20 (Firm's Hazard Rating Value created in the invention process) | 2,090.4 |

Building on the invention process just shown, a more sophisticated algorithm is created by developing additional factors. Defining these factors and explaining how their creation produces hazard rating values of enhanced value follows their introduction immediately below.

At step 910, an employer record is read from the IDBI, and for each firm a claims Frequency (data element 18) is calculated according to the formula: Firm's Total Number of claims (data element 12) divided by Firm's Employment (data element 15). The calculated Firm's claims Frequency portrays a rate of incidence of injuries and illnesses for each firm. Those firms with a large claims Frequency value are more hazardous than those firms with a small claims Frequency. A Firm's claims Severity (data element 19, the incurred loss per claim) is calculated according to the formula: Firm's Total Incurred WC Losses (data element 13) divided by Firm's Total Number of claims (data element 12). The calculated Firm's claims Severity value represents the severity (expressed in monetary terms) of the injuries and illnesses that have befallen that firm's employees. It logically follows that the more severe injuries or illnesses are, the greater will be associated medical claims losses (data element 10), and workers' compensation insurance reimbursement for wages lost and disability (in workers' compensation terms of art commonly referred to as indemnity claims losses, data element 9). These are the two components of Firm's Total Incurred WC Losses, data element 13, used in this algorithm. A Firm's Hazard Rating Value (HRV1, data element 20) is then calculated according to the formula: Firm's claims Frequency multiplied by Firm's claims Severity (as illustrated in the example above).

Other Hazard Rating Values for a firm are also calculated at step 910. Hazard Rating Value (HRV2) is calculated according to the formula: Firm's claims Frequency multiplied by Firm's claims Severity multiplied by Firm's Resource Efficiency Factor. Hazard Rating Value (HRV3) is calculated according to the formula: Firm's claims Frequency multiplied by Firm's claims Severity multiplied by Firm's Preventable Nature Factor. The preferred algorithm for calculating the Hazard Rating Value (HRV4) of a business firm is calculated according to the formula: Firm's claims Frequency multiplied by Firm's claims Severity multiplied by Firm's Resource Efficiency Factor multiplied by Firm's Preventable Nature Factor.

There is potentially a large number of hazard rating values that could be developed utilizing the data elements comprising this example of an IDBI data base. Data elements 4 through 20 could all individually, or in various combinations with each other, be used in establishing hazard rating values. Although statistically the various hazard rating values that could be calculated is finite, a user of this invention process, in customizing hazard rating values by firm would, in essence, be limited only by his or her imagination.

Again referring to FIG. 8, by utilizing each individual business firm's hazard rating values created in the invention, the next process (1000) of developing ranked listings of firms by their degree of hazardousness is a somewhat simple process. All that is needed is a computer software, read, sort, reformat, and list program. Using the preferred algorithm, the software at step 1010 first reads each individual firm's hazard rating value (created data element 20), assigns consecutive ordinal number ranking factors from highest hazard rating value to lowest hazard rating value, sorts all individual firm IDBI records using the hazard rating value field, and writes the records to the sorted IDBI enhanced data set file. At step 1020, a ranked listing of hazardous firms report is printed.

Figure 9:
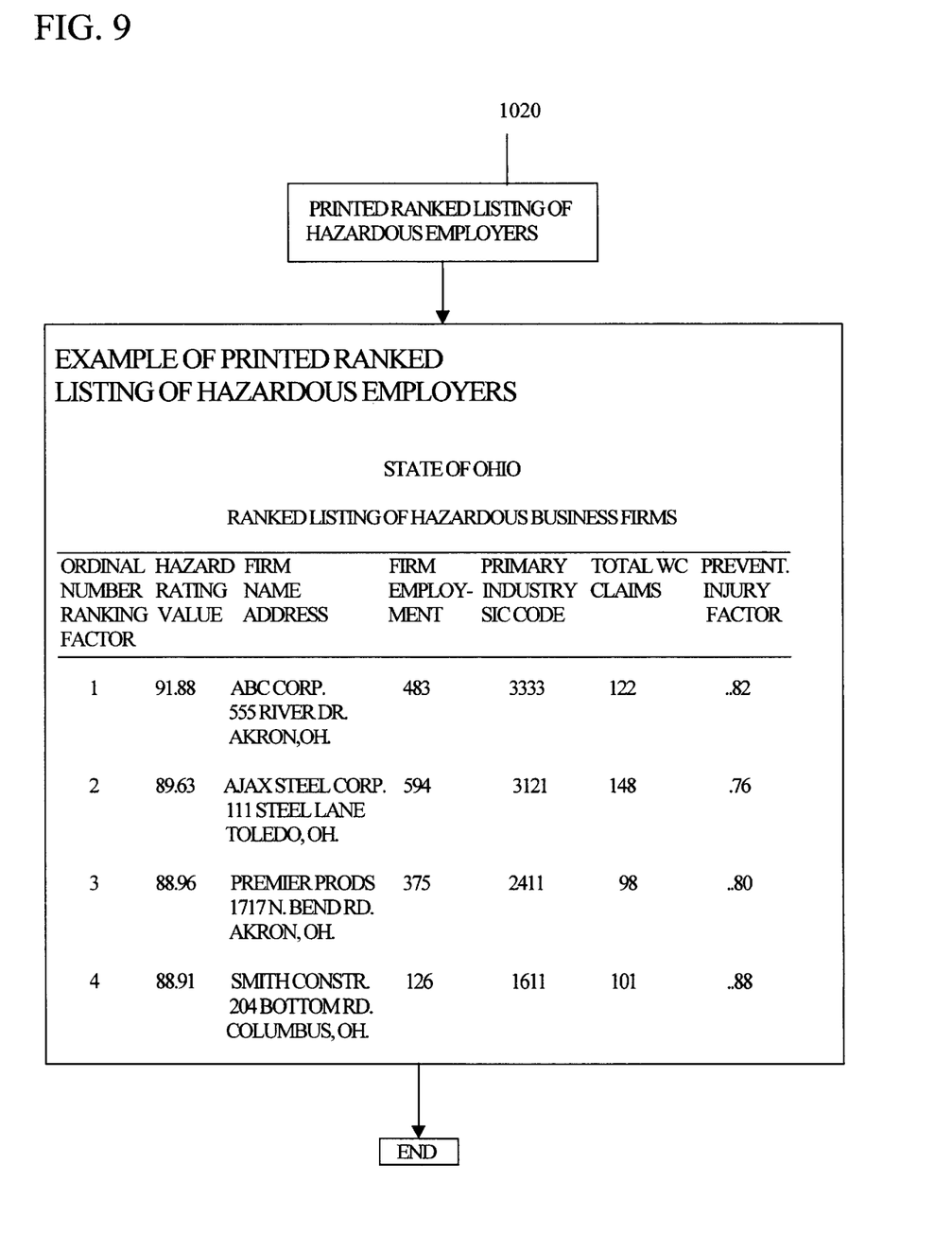
FIG. 9 is an example of a Ranked Listing of Hazardous Firms.

Referring to FIG. 9, the computer output of step 1020 is shown as an example of a ranked listing of hazardous firms for a jurisdiction. The listing can be used by government safety and health enforcement inspectors, government and private consultants, insurance companies, or other safety and health experts to target the most hazardous employers for inspections or assistance. The listing for a jurisdiction generally includes the ordinal number ranking factor, hazard rating value, firm name and address, firm employment, primary industry SIC, total WC claims, and preventable nature factor.

While preferred embodiments of the present invention have been shown and described herein, it will be obvious that such embodiments are provided by way of example only. Numerous variations, changes and substitutions will occur to those skilled in the art without departure from the invention process described herein. Accordingly, it is intended that the invention be limited only by the spirit and scope of the appended claim.

What is claimed is:

1. A method for estimating a firm's hazard rating value to create a computer generated ranked listing of hazardous firms, comprising:

(a) creating a crosswalk between insurance underwriting class codes and Standard Industrial Classification (SIC) codes, storing said class codes and SIC codes in a database, and sorting the class codes and the standard Industrial Classification SIC codes by computer to generate a Class Code-SIC Lookup Table for a selected jurisdiction:

(b) creating a SIC-Average Weekly Wage (AWW) Lookup Table, comprising all SICs for a selected jurisdiction and storing the SIC-Average Weekly Wage (AWW) Lookup Table in said database;

(c) computing a firm's average weekly wages from a primary source insurance data and matching said class code to a class code-SIC Lookup Table to obtain a computer generated corresponding SIC, storing the corresponding SIC in said database, and weighting each class code's SIC derived average weekly wage by the employer's class code payroll distribution; and (d) computing by computer a firms employment data by annualizing the firm's average weekly wage to obtain an average annual wage and relating said average annual wage to a firm's total annual payroll, and storing said employment data in said database, and analyzing said database to create a computer generated ranked listing of hazardous firms.

2. The method of claim 1, further comprising the steps of:

(a) creating a SIC-Preventable Nature Lookup Table in said database by identifying all SICs for a selected jurisdiction with published case counts by nature code; identifying all nature codes that are preventable; and mapping by computer for each SIC, all preventable nature codes and corresponding case counts and total case counts;

(b) reading employer records from a primary source insurance data to said database, and matching said employer records to a SIC-Preventable Nature Lookup Table for each underwriting class code in said employer record to obtain matched, stored SIC preventable case counts and total case counts; and (c) computing by computer for all SICs associated with one underwriting class code, a ratio of preventable nature cases for all of the subject SICs to a sum of total nature cases for all SICs associated with the corresponding class code, and then weighting each class code's combined SIC preventable nature factor by an employer's class code total cases distribution to produce a firm's preventable nature factor.

3. The method of claim 1, further comprising sorting the employer records by descending hazard rating values.

4. The method of claim 1, further comprising assigning consecutive ordinal number ranking factors to firms from highest hazard rating value to lowest hazard rating value.

5. The method of claim 1 (a), further comprising identifying all underwriting class codes used in a selected jurisdiction, storing said class codes in said database, and mapping by computer for each class code, all related SICs.

6. The method of claim 1 (b), further comprising mapping by computer the average weekly wage and statewide payroll to each published SIC, storing weekly wage and statewide payroll information in said database, and where required, imputing the average weekly wage and payroll for other SICs by retrieving from said database, a next higher level SIC.

7. The method of claim 1 (c), further comprising matching said class code to a Class Code-SIC Lookup Table to obtain a corresponding SIC AWW and said firm's statewide payroll; storing said class code and Lookup Table in said database, reading each SIC associated with one class code from said database, and computing the average weekly wage associated with said SIC by the ratio of statewide payroll for said SIC to the sum of statewide payroll for all SICs associated with the corresponding class code.

8. The method of claim 1, further comprising the steps of:

(a) creating a firm's claims frequency, which relates a firm's total claims to a firm's employment, and storing the firm's claims frequency in said database;

(b) creating a firm's claims severity, and storing the firm's claims severity on said database, which relates a firm's total incurred workers' compensation losses to a firm's total claims; and (c) computing by computer, a firm's hazard rating value (HRV1) from the data stored on said database by relating a firm's claims frequency to a firm's claims severity.

9. The method of claim 8 wherein said hazard rating value further comprises the steps of:

(a) computing a firm's resource efficiency factor, which relates the n-th root of a firm's employment; and (b) relating a firm's hazard rating value (HRV1) to a firm's resource efficiency factor to produce a firm's hazard rating value ($HRV_2$).

10. The method of claim 8 wherein said hazard rating value further comprises the step of relating a firm's hazard rating value (HRV1) to a firm's preventable nature factor to produce a firm's hazard rating value (HRV3).

11. The method of claim 10 wherein said hazard rating value further comprises the step of relating a firm's hazard rating value (HRV3) to a firm's resource efficiency factor to produce a firm's hazard rating value (HRV4).

12. A method for estimating a firm's hazard rating value to create a computer generated ranked listing of hazardous firms, comprising:

(a) creating a crosswalk between insurance underwriting class codes and Standard Industrial Classification (SIC) codes by identifying all underwriting class codes used in a selected jurisdiction, storing said class codes and SIC codes in a database, mapping by computer for each class code all related SICs, and sorting the class codes and the standard Industrial Classification SIC codes by computer to generate a Class Code-SIC Lookup Table for a selected jurisdiction:

(b) creating a SIC-Average Weekly Wage (AWW) Lookup Table comprising all SICs for a selected jurisdiction, storing the SIC-Average Weekly Wage (AWW) Lookup Table in said database, mapping by computer the average weekly wage and statewide payroll to each published SIC, and if required, imputing the average weekly wage and payroll for other SICs by retrieving from the next higher level SIC located in said database;

(c) computing a firm's average weekly wages by reading from a primary source insurance data and matching said class code to a class code-SIC Lookup Table to obtain a corresponding SIC, storing said corresponding SIC in said database, and weighting by computer each class code's SIC derived average weekly wage by the employer's class code payroll distribution; and (d) computing by computer a firms employment by annualizing the firm's average weekly wage to obtain an average annual wage and relating said average annual wage to a firm's total annual payroll, and storing said firm's average annual wage and said firms total annual payroll in said database, and accessing said database by computer to create a ranked listing of hazardous firms.

13. The method of claim 12, further comprising sorting the employer records by descending hazard rating values.

14. The method of claim 12, further comprising assigning consecutive ordinal number ranking factors to firms from highest hazard rating value to lowest hazard rating value.

15. The method of claim 12, further comprising matching said class code to a Class Code-SIC Lookup Table to obtain a corresponding SIC AWW and said firm's statewide payroll; entering the SIC AWW and said firm's statewide payroll on said database, and reading each SIC associated with one class code and relating the average weekly wage associated with said SIC by the ratio of statewide payroll for said SIC to compute the sum of statewide payroll for all SICs associated with the corresponding class code.

16. The method of claim 12, further comprising the steps of:

(a) creating by computer a SIC-Preventable Nature Lookup Table in said database by identifying all SICs for a selected jurisdiction with published case counts by nature code; identifying all nature codes that are preventable; and mapping by computer for each SIC, all preventable nature codes and corresponding case counts and total case counts;

(b) reading employer records from a primary source insurance data, entering employer records from the insurance data into said database, and matching by computer to a SIC-Preventable Nature Lookup Table for each underwriting class code in an employer record to obtain matched, stored SIC preventable case counts and total case counts; and (c) computing by computer for all SICs associated with one underwriting class code, a ratio of preventable nature cases for all of the subject SICs to a sum of total nature cases for all SICs associated with the corresponding class code, and then weighting each class code's combined SIC preventable nature factor by an employer's class code total cases distribution to produce a computer generated firm's preventable nature factor.

17. The method of claim 12, further comprising the steps of:

(a) creating a firm's claims frequency on said database, which relates a firm's total claims to a firm's employment;

(b) creating a firm's claims severity on said database, which relates a firm's total incurred workers' compensation losses to a firm's total claims; and (c) computing by computer a firm's hazard rating value (HRV1) stored on said database, by relating a firm's claims frequency to a firm's claims severity.

18. A method for estimating a firm's hazard rating value to create a computer generated ranked listing of hazardous firms, comprising:

(a) creating a crosswalk between insurance underwriting class codes and Standard Industrial Classification (SIC) codes by identifying all underwriting class codes used in a selected jurisdiction, storing said class codes and SIC codes in a database, mapping by computer for each class code all related SICs, and sorting by computer the class codes and the standard Industrial Classification SIC codes in a Class Code-SIC Lookup Table for a selected jurisdiction:

(b) creating a SIC-Average Weekly Wage (AWW) Lookup Table from the data stored in said database, comprising all SICs for a selected jurisdiction with published average weekly wages, mapping by computer the average weekly wage and statewide payroll to each published SIC, and if required, imputing the average weekly wage and payroll for other SICs by retrieving data from the next higher level SIC;

(c) computing a firm's average weekly wages from a primary source insurance data, storing said firm's average weekly wages in said database, and matching by computer said class code to a class code-SIC Lookup Table to obtain a corresponding SIC, and weighting each class code's SIC derived average weekly wage by the employer's class code payroll distribution; and (d) computing by computer a firms employment by annualizing the firm's average weekly wage to obtain an average annual wage and relating said average annual wage to a firm's total annual payroll, to determine a ranked listing of hazardous firms;

(e) sorting by computer the employer records by descending hazard rating values; and (f) assigning consecutive ordinal number ranking factors to firms from highest hazard rating value to lowest hazard rating value.

* * * * *